US012789126B2

(12) United States Patent
Hou et al.

(10) Patent No.: US 12,789,126 B2
(45) Date of Patent: Nov. 10, 2026

(54) STATUS DETECTION METHOD AND APPARATUS FOR FILTER

(71) Applicant: GE Precision Healthcare LLC, Wauwatosa, WI (US)

(72) Inventors: Cheng Hou, Wuxi (CN); Albert Liu, Wuxi (CN); Bin Tan, Wuxi (CN); Mingming Meng, Wuxi (CN); Kristen E. Nelson Mock, Lake Mills, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 759 days.

(21) Appl. No.: 17/984,863

(22) Filed: Nov. 10, 2022

(65) Prior Publication Data

US 2023/0158436 A1 May 25, 2023

(30) Foreign Application Priority Data

Nov. 23, 2021 (CN) ........................ 202111393547.9

(51) Int. Cl.
*B01D 53/22* (2006.01)
*B01D 46/00* (2022.01)

(52) U.S. Cl.
CPC ...... *B01D 46/0086* (2013.01); *B01D 2201/34* (2013.01); *B01D 2201/54* (2013.01)

(58) Field of Classification Search
CPC ............ B01D 46/0086; B01D 2201/34; B01D 2201/54
See application file for complete search history.

(56) References Cited

U.S. PATENT DOCUMENTS

| | | | | |
|---|---|---|---|---|
| 4,923,602 A * | 5/1990 | Blood | B01D 35/15 | 210/453 |
| 5,484,536 A * | 1/1996 | Yamaguchi | B01D 29/114 | 210/791 |
| 6,377,171 B1 * | 4/2002 | Fewel | B01D 29/117 | 73/861.47 |
| 6,606,994 B1 | 8/2003 | Clark | | |
| 6,945,123 B1 * | 9/2005 | Kuehl | A61M 16/01 | 73/861.42 |
| 9,339,750 B2 * | 5/2016 | Eberle | B01D 46/003 | |

(Continued)

FOREIGN PATENT DOCUMENTS

| | | |
|---|---|---|
| CN | 208893780 U | 5/2019 |
| DE | 112008002950 T5 | 9/2010 |

*Primary Examiner* — Anthony Shumate

(57) ABSTRACT

A medical device including a channel configured to provide fluid flow; a filtered provided in the channel; a pressure sensor provided in the channel at location downstream from the filter; a memory storing instructions; and a processor configured to execute the instructions to: control fluid to flow through the channel at a first flow rate and acquire, from the pressure sensor, a first pressure value at the first flow rate; control fluid to flow through the channel at a second flow rate and acquire, from the pressure sensor, a second pressure value at the second flow rate; determine a state of the filter according to a first difference value between the first pressure value and the second pressure value; determine a state of the filter based on the first difference value; and based on a determination that the filter is in an abnormal state, output a service indicator.

9 Claims, 5 Drawing Sheets

(56) References Cited

U.S. PATENT DOCUMENTS

| | | | | |
|---|---|---|---|---|
| 2005/0139541 | A1* | 6/2005 | Peet | B01D 35/0273 210/171 |
| 2005/0224466 | A1* | 10/2005 | Halvorsen | B23K 9/0953 219/74 |
| 2006/0118478 | A1* | 6/2006 | Linhart | B01D 63/066 210/348 |
| 2009/0112491 | A1* | 4/2009 | Nakada | G01F 25/15 702/183 |
| 2012/0267294 | A1* | 10/2012 | Herman | B01D 29/232 210/137 |
| 2020/0188624 | A1* | 6/2020 | Nelson Mock | A61M 16/104 |
| 2020/0368958 | A1* | 11/2020 | Higashi | B29B 7/726 |
| 2024/0381572 | A1* | 11/2024 | Stammer | B01D 29/606 |

* cited by examiner

STATUS DETECTION METHOD AND APPARATUS FOR FILTER

CROSS-REFERENCE TO RELATED APPLICATION(S)

This application is based on and claims priority to Chinese Patent Application No. 202111393547.9, filed on Nov. 23, 2021 in the Chinese Patent Office, the disclosure of which is incorporated herein by reference in its entirety.

TECHNICAL FIELD

Embodiments of the present application relate to the technical field of medical devices, and in particular to a status detection apparatus for a filter.

BACKGROUND

In a medical device such as an anesthesia machine, a ventilator, or the like, if supplied gas has poor quality (especially humid air), then an electronic component is prone to be corroded. Therefore, the medical device is often provided with a filter capable of solving problems such as reducing moisture. For example, a coalescing filter is one of filters commonly used in the medical device, can be mounted between an external gas circuit and the medical device, and is used to filter out impurities such as moisture.

SUMMARY

According to an aspect of the embodiments of the present application, a status detection method for a filter is provided, the filter filtering a fluid in a sealed channel, at least a pressure sensor being further provided downstream of the filter in the sealed channel, and the method comprising: if the fluid flowing through the filter in the sealed channel is controlled to have a first flow rate, then acquiring a first pressure value measured by the pressure sensor; if the fluid flowing through the filter in the sealed channel is controlled to have a second flow rate, then acquiring a second pressure value measured by the pressure sensor; and determining a status of the filter according to a difference between the first pressure value and the second pressure value.

In some embodiments, determining the status of the filter according to the difference between the first pressure value and the second pressure value comprises: if a first difference between the first pressure value and the second pressure value is greater than a first threshold, then determining that the filter is in an abnormal state; and if the first difference between the first pressure value and the second pressure value is less than or equal to the first threshold, then determining that the filter is in a normal state.

In some embodiments, the method further comprises: if the fluid flowing through the filter in the sealed channel is controlled to have a third flow rate and is maintained for a time period, then acquiring a maximum pressure value and a minimum pressure value measured by the pressure sensor within the time period; and calculating a second difference between the maximum pressure value and the minimum pressure value and/or an average value of the maximum pressure value and the minimum pressure value.

In some embodiments, the method further comprises: determining whether the second difference between the maximum pressure value and the minimum pressure value is greater than a second threshold; and if so, then stopping status detection performed on the filter; and if not, then determining the status of the filter according to the difference between the first pressure value and the second pressure value.

In some embodiments, the method further comprises: calculating a third difference between a first difference between the first pressure value and the second pressure value and the second difference.

In some embodiments, determining the status of the filter according to the difference between the first pressure value and the second pressure value comprises: if the third difference is greater than a third threshold, then determining that the filter is in an abnormal state; and if the third difference is less than or equal to the third threshold, then determining that the filter is in a normal state.

In some embodiments, the method further comprises: determining whether the average value of the maximum pressure value and the minimum pressure value is less than a fourth threshold.

In some embodiments, determining the status of the filter according to the difference between the first pressure value and the second pressure value comprises: if the average value is less than the fourth threshold and the third difference is greater than a fifth threshold, then determining that the filter is in an abnormal state; and if the average value is less than the fourth threshold and the third difference is less than or equal to the fifth threshold, then determining that the filter is in a normal state.

In some embodiments, determining the status of the filter according to the difference between the first pressure value and the second pressure value comprises: if the average value is greater than or equal to the fourth threshold and the third difference is greater than a sixth threshold, then determining that the filter is in an abnormal state; and if the average value is greater than or equal to the fourth threshold and the third difference is less than or equal to the sixth threshold, then determining that the filter is in a normal state.

According to another aspect of the embodiments of the present application, a status detection apparatus for a filter is provided, the filter filtering a fluid in a sealed channel, at least a pressure sensor being further provided downstream of the filter in the sealed channel, and the apparatus comprising: a first acquisition unit for acquiring a first pressure value measured by the pressure sensor if the fluid flowing through the filter in the sealed channel is controlled to have a first flow rate; a second acquisition unit for acquiring a second pressure value measured by the pressure sensor if the fluid flowing through the filter in the sealed channel is controlled to have a second flow rate; and a status determination unit for determining a status of the filter according to a difference between the first pressure value and the second pressure value.

In some embodiments, the status determination unit determines that the filter is in an abnormal state if a first difference between the first pressure value and the second pressure value is greater than a first threshold; and the status determination unit determines that the filter is in a normal state if the first difference between the first pressure value and the second pressure value is less than or equal to the first threshold.

In some embodiments, the apparatus further comprises: a third acquisition unit for acquiring a maximum pressure value and a minimum pressure value measured by the pressure sensor within a time period if the fluid flowing through the filter in the sealed channel is controlled to have a third flow rate and is maintained for the time period; and a calculation unit for calculating a second difference between the maximum pressure value and the minimum pressure value and/or an average value of the maximum pressure value and the minimum pressure value.

In some embodiments, the status determination unit is further configured to: determine whether the second difference between the maximum pressure value and the minimum pressure value is greater than a second threshold; and if so, then stop status detection performed on the filter; and if not, then determine the status of the filter according to the difference between the first pressure value and the second pressure value.

In some embodiments, the calculation unit is further configured to: calculate a third difference between a first difference between the first pressure value and the second pressure value and the second difference.

In some embodiments, the status determination unit determines that the filter is in an abnormal state if the third difference is greater than a third threshold; and the status determination unit determines that the filter is in a normal state if the third difference is less than or equal to the third threshold.

In some embodiments, the status determination unit is further configured to: determine whether the average value of the maximum pressure value and the minimum pressure value is less than a fourth threshold.

In some embodiments, the status determination unit determines that the filter is in an abnormal state if the average value is less than the fourth threshold and the third difference is greater than a fifth threshold; and the status determination unit determines that the filter is in a normal state if the average value is less than the fourth threshold and the third difference is less than or equal to the fifth threshold.

In some embodiments, the status determination unit determines that the filter is in an abnormal state if the average value is greater than or equal to the fourth threshold and the third difference is greater than a sixth threshold; and the status determination unit determines that the filter is in a normal state if the average value is greater than or equal to the fourth threshold and the third difference is less than or equal to the sixth threshold.

According to still another aspect of the embodiments of the present application, a medical device is provided, provided with a filter, the filter filtering a fluid in a sealed channel, and at least a pressure sensor being further provided downstream of the filter in the sealed channel, characterized in that the medical device further comprises the aforementioned status detection apparatus for a filter.

In some embodiments, the filter is a coalescing filter.

According to yet another aspect of the embodiments of the present application, a storage medium storing a computer-readable program is provided, characterized in that the computer-readable program causes a computer to perform, in a device, the aforementioned status detection method for a filter.

One of the beneficial effects of the embodiments of the present application is as follows: a pressure sensor provided downstream of a filter is used to acquire a first pressure value and a second pressure value corresponding to different flow rates, and a status of the filter is determined according to a difference between the first pressure value and the second pressure value. Therefore, detection of the status of the filter is facilitated, and an operator is prompted to maintain/replace the filter in time. In addition, an existing component can be used, so that applicability is high and detection costs are low.

With reference to the following description and accompanying drawings, specific implementation manners of embodiments of the present application are disclosed in detail, and manners in which the principle of the embodiments of the present application is implemented are illustrated. It should be understood that the implementation manners of the present application are not limited in scope in this case. The implementation manners of the present application comprise many variations, modifications, and equivalents within the spirit and the scope of clauses of the appended claims.

BRIEF DESCRIPTION OF THE DRAWINGS

The accompanying drawings, which are incorporated in and constitute a part of the description, serve to provide further understanding of embodiments of the present application, serve to illustrate implementation manners of the present application, and explain the principle of the present application together with the description. Apparently, the accompanying drawings in the following description illustrate merely some embodiments of the present application, and those of ordinary skill in the art may also obtain other implementation manners according to these accompanying drawings without making any creative effort. In the accompanying drawings.

DETAILED DESCRIPTION

Figure 1:
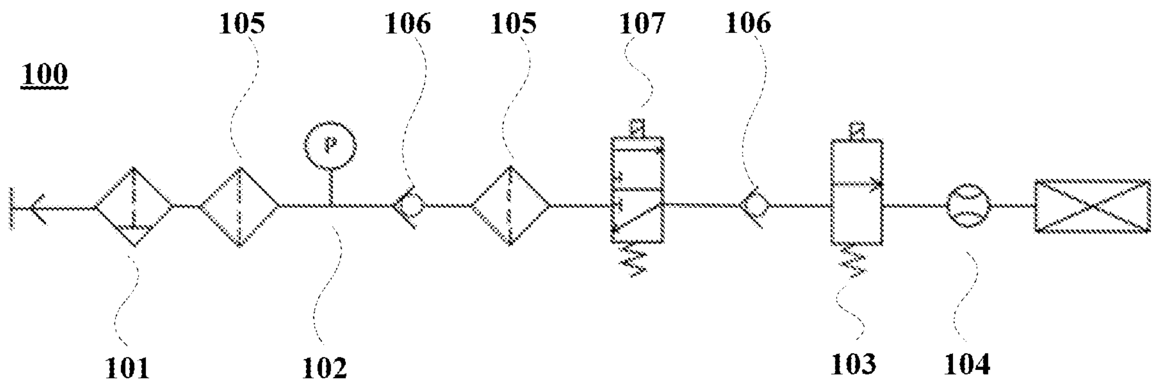
FIG. 1 is a schematic diagram of a gas circuit of a medical device according to embodiments of the present application.

With reference to the accompanying drawings and on the basis of the following description, the aforementioned and other features of embodiments of the present application will become apparent. The description and the accompanying drawings specifically disclose specific implementation manners of the present application, and indicate some implementation manners that can use the principle of the embodiments of the present application. It should be understood that the present application is not limited to the described implementation manners, and on the contrary, the embodiments of the present application include all modifications, variations, and equivalents within the scope of the appended claims.

In the embodiments of the present application, terms "first," "second," and the like are used to differentiate different elements with respect to names but do not indicate spatial arrangement or temporal orders of these elements, and these elements should not be limited by these terms. The term "and/or" includes any one and all combinations of one or more relevantly listed terms. The terms "contain," "include," and "have" refer to existence of stated features, elements, components, or assemblies, but do not exclude existence or addition of one or more other features, elements, components, or assemblies.

In the embodiments of the present application, single forms "a," "the," and the like include plural forms, should be understood as "a kind of" or "a type of" in a broad sense, but should not be defined as a meaning of "one"; in addition, the term "the" should be understood as including both a single form and a plural form, unless specified otherwise in the context. In addition, the term "according to" should be understood as "at least partially according to . . . "; the term "based on" should be understood as "at least partially based on," unless specified otherwise in the context.

The features described and/or illustrated with respect to an implementation manner may be used in one or more other implementation manners in the same or similar manner, or may be combined with the features in other implementation manners, or may be used to replace the features in other implementation manners. The term "comprise/include" used herein refers to existence of features, whole pieces, steps, or assemblies, but do not exclude existence or addition of one or more of other features, whole pieces, steps, or assemblies.

The inventors have found the following: depending on environmental conditions such as humidity and the like in a place where a device is located, the service life of a filter (for example, a coalescing filter) varies. Therefore, it is difficult to determine a maintenance period of the filter, and a status of the filter is prone to be overlooked by an operator. If an overused filter is not maintained or replaced in time, then performance configurations of the medical device are reduced, causing damage to the medical device.

The embodiments of the present application provide a status detection method for a filter. The filter filters a fluid in a sealed channel. At least a pressure sensor is further provided downstream of the filter in the sealed channel.

In some embodiments, the filter may be mounted on a medical device such as an anesthesia machine or a ventilator, and a sealed channel including a filter, a pressure sensor, and other components is provided in the anesthesia machine or the ventilator; however, the present application is not limited thereto. For another medical device on which a filter is mounted, the status detection method for a filter according to the embodiments of the present application is also applicable thereto.

A gas circuit of the aforementioned medical device is described below. The sealed channel according to the embodiments of the present application is used to guide a fluid. The fluid may be a gas, and may also be a suspension of a mixture of a gas and a liquid; for details, please refer to fluid components in an existing anesthesia machine or ventilator.

FIG. 1 is a schematic diagram of the gas circuit of the medical device according to the embodiments of the present application, and exemplarily illustrates a part of a sealed channel 100. In some scenarios, the medical device may be an anesthesia machine, a ventilator, or the like having a gas circuit structure. As shown in FIG. 1, the sealed channel 100 of the medical device may include a filter. The filter may be a coalescing filter 101. A pressure sensor 102, a flow rate control valve 103, and a flow rate sensor 104 are provided downstream of the coalescing filter 101. In addition, the aforementioned medical device may further include a standard filter 105, a checking valve 106, a gas selection valve 107, and the like.

As shown in FIG. 1, a fluid from an inlet of a pipeline may be driven/controlled, and may be conveyed to a downstream subsystem. This subsystem may control a fluid flow rate (for example, from 0 to 15 L/min) by means of the flow rate control valve 103. During this operation, the flow rate sensor 104 measures the fluid flow rate, and the pressure sensor 102 measures a fluid pressure.

The filter and the sealed channel according to the embodiments of the present application are exemplarily described above; however, the present application is not limited thereto. A specific structure and corresponding components of the sealed channel may be configured according to actual requirements. In addition, the sealed channel may be intrinsically provided in the medical device, and may also be formed by a sealing component and the like during status detection; this is not limited by the present application. For example, in a typical scenario, the aforementioned gas circuit is integrated into an anesthesia machine or a ventilator so as to dispense a gas to the anesthesia machine and the ventilator. In addition, a gas source of the aforementioned gas circuit may be a centralized gas supply system of a hospital. The coalescing filter is used as an example for description. However, the present application is not limited thereto; for example, a filter of another type may also be used.

The inventors have found the following: within a certain flow rate range (for example, 0-15 L/min) and at a specific pressure input, a pressure drop caused by a new coalescing filter is very small. However, for an old coalescing filter (overused, for example, after the filter is submerged or wetted by water), the pressure drop increases significantly.

Table 1 shows the pressure drop of the coalescing filter in different states changing as the flow rate changes according to the embodiments of the present application. It is assumed that an input pressure is configured to be 450 kpa and that a gas medium is medical air.

TABLE 1

| | 1 L/min | 5 L/min | 12.5 L/min | 25 L/min | 50 L/min |
|---|---|---|---|---|---|
| Old filter | 4.5 kpa | 13.2 kpa | 19.2 kpa | 22.2 kpa | 27 kpa |
| New filter | 0.5 kpa | 0.8 kpa | 1.2 kpa | 2.1 kpa | 5.1 kpa |

As shown in Table 1, for example, for the new filter, a pressure drop at a flow rate of 1 L/min is 0.5 kpa, and a pressure drop at a flow rate of 12.5 L/min is 1.2 kpa; a change in the pressure drop is relatively small. However, for the old filter, a pressure drop at a flow rate of 1 L/min is 4.5 kpa, and a pressure drop at a flow rate of 12.5 L/min is 19.2 kpa; the pressure drop increases significantly.

On this basis, the inventors have found that the pressure drop can be used as a parameter for detection of a status of the coalescing filter. Sampling of gas pressures located upstream of and downstream of the filter needs to be performed so as to acquire the pressure drop. However, it is difficult to for some existing medical devices (such as an anesthesia machine/ventilator) to measure a gas pressure located upstream of the filter. In some use scenarios, a gas located upstream of the filter often comes from a centralized gas supply system of a hospital or another gas source, and no pressure measurement device is provided. In addition, safety requirements of the compact structure of the medical device result in that additionally mounting a pressure measurement apparatus is difficult and risky. The inventors have further found that a change in the pressure located downstream of the filter can be used as a parameter for detection of a status of the filter. Specific detection methods will be described in detail below.

Figure 2:
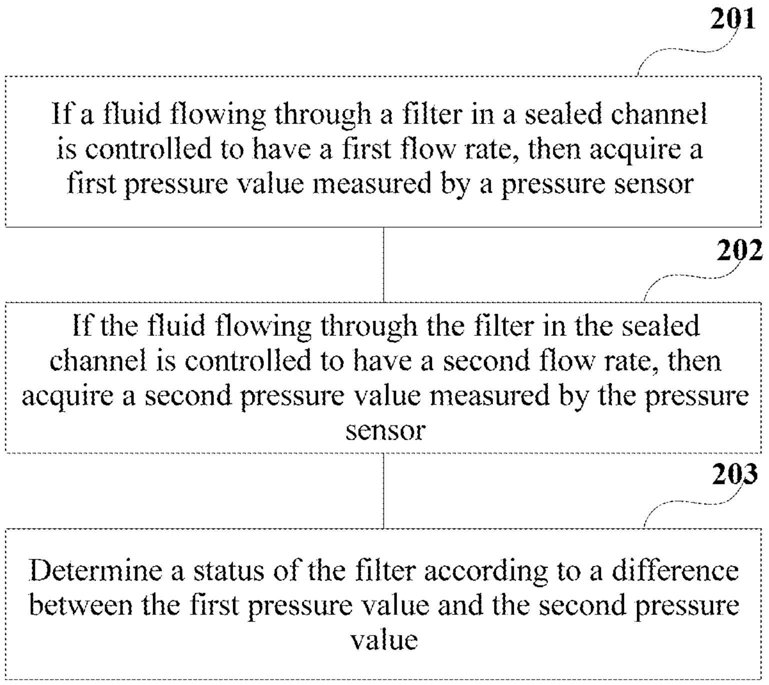
FIG. 2 is a schematic diagram of a status detection method for a filter according to embodiments of the present application.

FIG. 2 is a schematic diagram of a status detection method for a filter according to the embodiments of the present application. A coalescing filter is used as an example for detailed description. As shown in FIG. 2, the method includes:

201, if a fluid flowing through a filter in a sealed channel is controlled to have a first flow rate, then acquire a first pressure value measured by a pressure sensor;

202, if the fluid flowing through the filter in the sealed channel is controlled to have a second flow rate, then acquire a second pressure value measured by the pressure sensor; and

203, determine a status of the filter according to a difference between the first pressure value and the second pressure value.

It should be noted that FIG. 2 merely schematically illustrates the embodiments of the present application; however, the present application is not limited thereto. For example, an execution sequence of various operations may be adjusted appropriately; in addition, some other operations may be added, or some operations therein may be removed. Those skilled in the art may make appropriate variations according to the above disclosure, and this is not limited merely to the disclosure of FIG. 2.

In some embodiments, determining the status of the filter according to the difference between the first pressure value and the second pressure value includes: if a first difference between the first pressure value and the second pressure value is greater than a first threshold, then determining that the filter is in an abnormal state; and if the first difference between the first pressure value and the second pressure value is less than or equal to the first threshold, then determining that the filter is in a normal state.

For example, it is assumed that the first threshold is 10 kpa. If the first flow rate is 1 L/min, then the first pressure value acquired by the pressure sensor is 449 kpa. If the second flow rate is 15 L/min, then the second pressure value acquired by the pressure sensor is 448 kpa. The first difference D1 between the first pressure value and the second pressure value is 1 kpa, and is less than or equal to the first threshold, namely 10 kpa. Therefore, it can be determined that the coalescing filter is in a normal state.

For another example, if the first flow rate is 1 L/min, then the first pressure value acquired by the pressure sensor is 445 kpa. If the second flow rate is 15 L/min, then the second pressure value acquired by the pressure sensor is 430 kpa. The first difference D1 between the first pressure value and the second pressure value is 15 kpa, and is greater than the first threshold, namely 10 kpa. Therefore, it can be determined that the coalescing filter is in an abnormal state.

Therefore, the status of the coalescing filter is determined according to the difference between the first pressure value and the second pressure value. Detection of the status of the coalescing filter is facilitated, and an operator is prompted to maintain/replace the filter in time. In addition, an existing component can be used (for example, only an existing downstream pressure sensor needs to be used, and there is no need to add a new upstream pressure sensor), so that applicability is high and detection costs are low. It can be understood that the detailed description is provided by using the coalescing filter in the examples disclosed herein, and on the basis of the teaching of the present disclosure, the aforementioned examples can also be applied to filters of other types.

In some embodiments, if the fluid flowing through the filter in the sealed channel is controlled to have a third flow rate and is maintained for a time period, then a maximum pressure value and a minimum pressure value measured by the pressure sensor within the time period are acquired; and a second difference between the maximum pressure value and the minimum pressure value is calculated, and/or an average value of the maximum pressure value and the minimum pressure value is calculated.

In some embodiments, it may also be determined whether the second difference between the maximum pressure value and the minimum pressure value is greater than a second threshold; and if so, then status detection performed on the filter is stopped; and if not, then the status of the filter is determined according to the difference between the first pressure value and the second pressure value.

Figure 3:
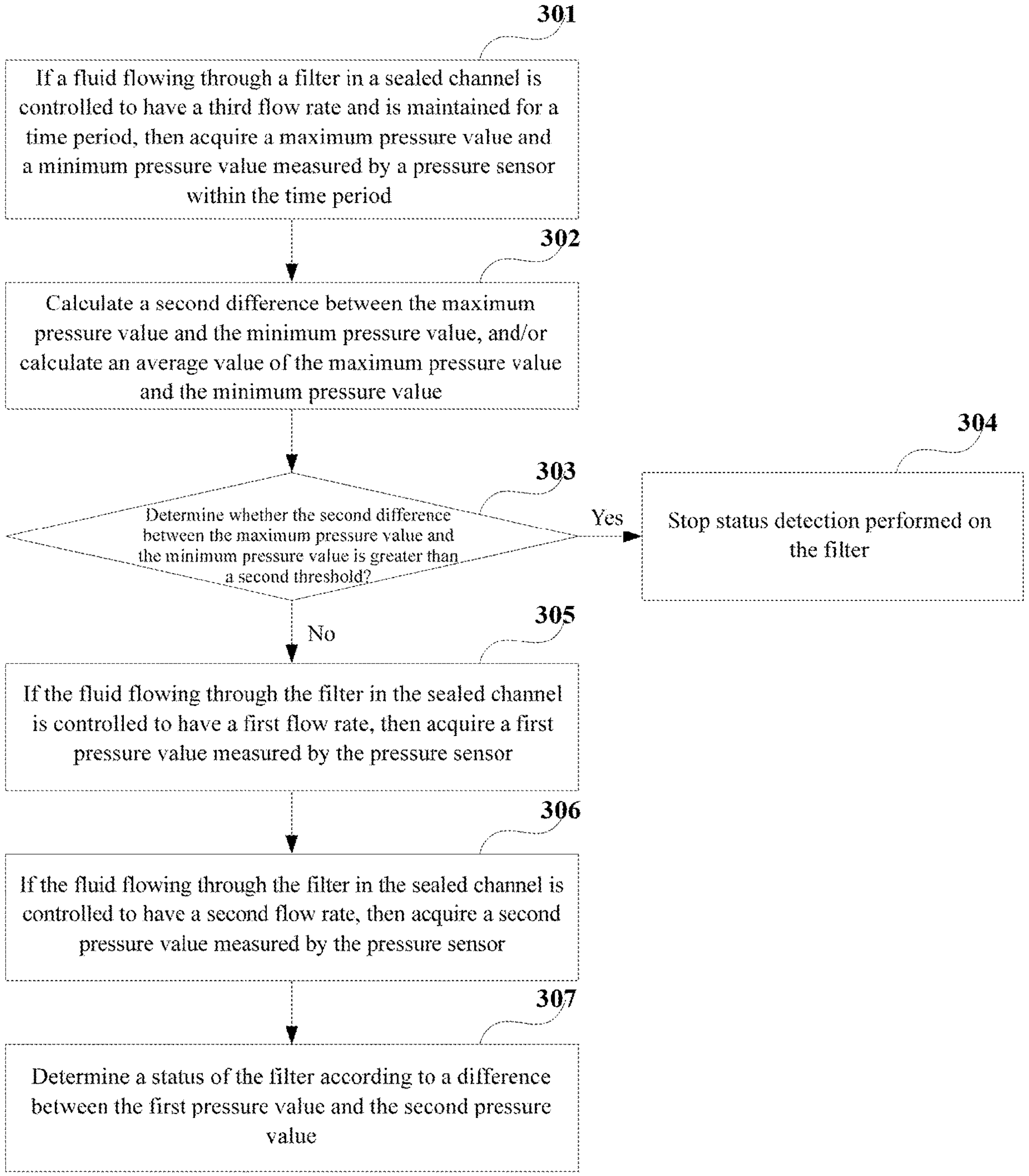
FIG. 3 is another schematic diagram of a status detection method for a filter according to embodiments of the present application.

FIG. 3 is another schematic diagram of a status detection method for a filter according to the embodiments of the present application. A coalescing filter is used as an example for detailed description. As shown in FIG. 3, the method includes:

301, if a fluid flowing through a filter in a sealed channel is controlled to have a third flow rate and is maintained for a time period, then acquire a maximum pressure value and a minimum pressure value measured by a pressure sensor within the time period; and

302, calculate a second difference between the maximum pressure value and the minimum pressure value, and/or calculate an average value of the maximum pressure value and the minimum pressure value.

For example, the third flow rate is 5 L/min and may be maintained for a time period (such as 15 seconds), and a maximum pressure value Max and a minimum pressure value Min within this time period are acquired; then a second difference D2 between the maximum pressure value and the minimum pressure value is calculated, where D2=Max−Min, and/or an average value A of the maximum pressure value and the minimum pressure value is calculated, where A=(Max+Min)/2.

As shown in FIG. 3, the method further includes:

303, determine whether the second difference between the maximum pressure value and the minimum pressure value is greater than a second threshold; and if so, then execute 304; and if not, then execute 305.

For example, it is assumed that the second threshold is 20 kpa. If the maximum pressure value acquired by the pressure sensor is 449 kpa, and if the minimum pressure value acquired by the pressure sensor is 448 kpa, then the second difference D2 between the maximum pressure value and the maximum pressure value is 1 kpa, and is less than or equal to the second threshold, namely 20 kpa. Therefore, determination of the status of the coalescing filter may be continued.

304, stop status detection performed on the filter.

For another example, if the maximum pressure value acquired by the pressure sensor is 449 kpa, and if the minimum pressure value acquired by the pressure sensor is 428 kpa, then the second difference D2 between the maximum pressure value and the maximum pressure value is 21 kpa, and is greater than the second threshold, namely 20 kpa. Therefore, in this case, an additional abnormal condition may occur, such as channel leakage, gas source unsteadiness, and the like. In this case, status monitoring performed on the coalescing filter needs to be stopped, and alarm information may be sent so that the operator can perform troubleshooting.

As shown in FIG. 3, the method further includes:

305, if the fluid flowing through the filter in the sealed channel is controlled to have a first flow rate, then acquire a first pressure value measured by the pressure sensor;

306, if the fluid flowing through the filter in the sealed channel is controlled to have a second flow rate, then acquire a second pressure value measured by the pressure sensor; and

307, determine a status of the filter according to a difference between the first pressure value and the second pressure value.

In some embodiments, as described above, determining the status of the filter according to the difference between the first pressure value and the second pressure value in 307 may include: if a first difference between the first pressure value and the second pressure value is greater than a first threshold, then determining that the filter is in an abnormal state; and if the first difference between the first pressure value and the second pressure value is less than or equal to the first threshold, then determining that the filter is in a normal state.

For example, it is assumed that the first threshold is 10 kpa. If the first flow rate is 1 L/min, then the first pressure value acquired by the pressure sensor is 449 kpa. If the second flow rate is 15 L/min, then the second pressure value acquired by the pressure sensor is 448 kpa. The first difference D1 between the first pressure value and the second pressure value is 1 kpa, and is less than or equal to the first threshold, namely 10 kpa. Therefore, it can be determined that the coalescing filter is in a normal state.

For another example, if the first flow rate is 1 L/min, then the first pressure value acquired by the pressure sensor is 445 kpa. If the second flow rate is 15 L/min, then the second pressure value acquired by the pressure sensor is 430 kpa. The first difference D1 between the first pressure value and the second pressure value is 15 kpa, and is greater than the first threshold, namely 10 kpa. Therefore, it can be determined that the coalescing filter is in an abnormal state.

It should be noted that FIG. 3 merely schematically illustrates the embodiments of the present application; however, the present application is not limited thereto. For example, an execution sequence of various operations may be adjusted appropriately; in addition, some other operations may be added, or some operations therein may be removed. Those skilled in the art may make appropriate variations according to the above disclosure, and this is not limited merely to the disclosure of FIG. 3.

Figure 4:
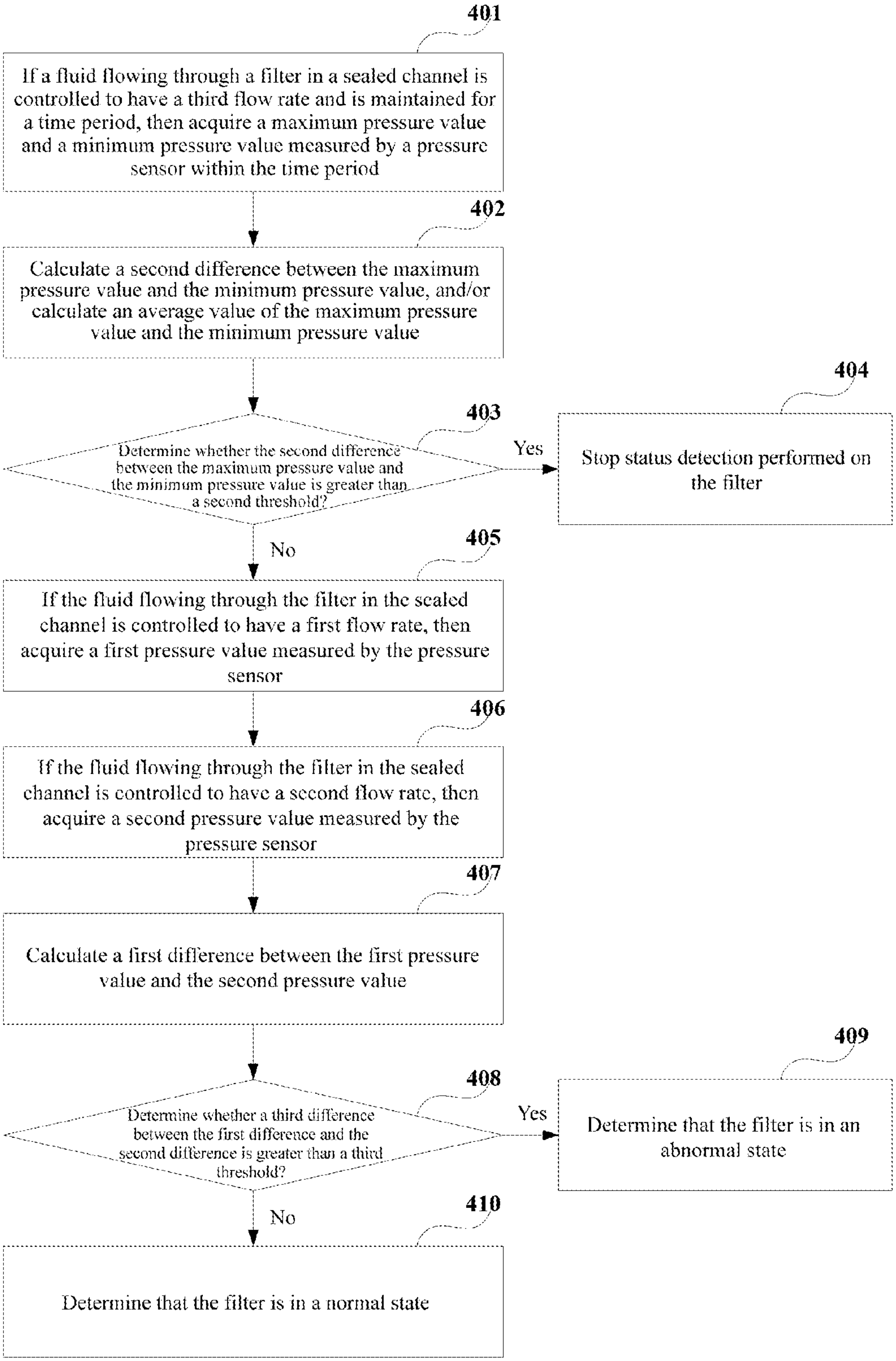
FIG. 4 is another schematic diagram of a status detection method for a filter according to embodiments of the present application.

FIG. 4 is another schematic diagram of a status detection method for a filter according to the embodiments of the present application. A coalescing filter is used as an example for detailed description. As shown in FIG. 4, the method includes:

401, if a fluid flowing through a filter in a sealed channel is controlled to have a third flow rate and is maintained for a time period, then acquire a maximum pressure value and a minimum pressure value measured by a pressure sensor within the time period; and

402, calculate a second difference between the maximum pressure value and the minimum pressure value, and/or calculate an average value of the maximum pressure value and the minimum pressure value.

For example, the third flow rate is 5 L/min and may be maintained for a time period (such as 15 seconds), and a maximum pressure value Max and a minimum pressure value Min within this time period are acquired; then a second difference D2 between the maximum pressure value and the minimum pressure value is calculated, where D2=Max−Min, and/or an average value A of the maximum pressure value and the minimum pressure value is calculated, where A=(Max+Min)/2.

As shown in FIG. 4, the method further includes:

403, determine whether the second difference between the maximum pressure value and the minimum pressure value is greater than a second threshold; and if so, then execute 404; and if not, then execute 405.

For example, it is assumed that the second threshold is 20 kpa. If the maximum pressure value acquired by the pressure sensor is 449 kpa, and if the minimum pressure value acquired by the pressure sensor is 448 kpa, then the second difference D2 between the maximum pressure value and the maximum pressure value is 1 kpa, and is less than or equal to the second threshold, namely 20 kpa. Therefore, determination of the status of the coalescing filter may be continued.

404, stop status detection performed on the filter.

For another example, if the maximum pressure value acquired by the pressure sensor is 449 kpa, and if the minimum pressure value acquired by the pressure sensor is 428 kpa, then the second difference D2 between the maximum pressure value and the maximum pressure value is 21 kpa, and is greater than the second threshold, namely 20 kpa. Therefore, in this case, an additional abnormal condition may occur, such as channel leakage, gas source unsteadiness, and the like. In this case, status monitoring performed on the coalescing filter needs to be stopped, and alarm information may be sent so that the operator can perform troubleshooting.

As shown in FIG. 4, the method further includes:

405, if the fluid flowing through the filter in the sealed channel is controlled to have a first flow rate, then acquire a first pressure value measured by the pressure sensor;

406, if the fluid flowing through the filter in the sealed channel is controlled to have a second flow rate, then acquire a second pressure value measured by the pressure sensor; and

407, calculate a first difference between the first pressure value and the second pressure value.

408, determine whether a third difference between the first difference and the second difference is greater than a third threshold;

if the third difference is greater than the third threshold, then execute 409; if the third difference is less than or equal to the third threshold, then execute 410.

409, determine that the filter is in an abnormal state; and

410, determine that the filter is in a normal state.

For example, it is assumed that the third threshold is 10 kpa. If the first flow rate is 1 L/min, then the first pressure value acquired by the pressure sensor is 449 kpa. If the second flow rate is 15 L/min, then the second pressure value acquired by the pressure sensor is 448 kpa. The first difference D1 between the first pressure value and the second pressure value is 1 kpa. In addition, if the second difference D2 between the maximum pressure value and the minimum pressure value calculated in 302 is 1 kpa, then the third difference D3 between the first difference and the second difference is 0, and is less than or equal to the third threshold, namely 10 kpa. Therefore, it can be determined that the coalescing filter is in a normal state.

For another example, if the first flow rate is 1 L/min, then the first pressure value acquired by the pressure sensor is 445 kpa. If the second flow rate is 15 L/min, then the second pressure value acquired by the pressure sensor is 430 kpa. The first difference D1 between the first pressure value and the second pressure value is 15 kpa. In addition, if the second difference D2 between the maximum pressure value and the minimum pressure value calculated in 302 is 1 kpa, then the third difference D3 between the first difference and the second difference is 14 kpa, and is greater than the third threshold, namely 10 kpa. Therefore, it can be determined that the coalescing filter is in an abnormal state.

It should be noted that FIG. 4 merely schematically illustrates the embodiments of the present application; however, the present application is not limited thereto. For example, an execution sequence of various operations may be adjusted appropriately; in addition, some other operations may be added, or some operations therein may be removed. Those skilled in the art may make appropriate variations according to the above disclosure, and this is not limited merely to the disclosure of FIG. 4.

Therefore, by using the second difference as a parameter, determination is performed in advance, so that effects of other additional factors can be excluded before status detection. In addition, both the first difference and the second difference are used as detection parameters, thereby further improving accuracy of status detection.

In some embodiments, it may be determined whether the average value of the maximum pressure value and the minimum pressure value is less than a fourth threshold. Determining the status of the filter according to the difference between the first pressure value and the second pressure value includes:

if the average value is less than the fourth threshold and the third difference is greater than a fifth threshold, then determining that the filter is in an abnormal state; if the average value is less than the fourth threshold and the third difference is less than or equal to the fifth threshold, then determining that the filter is in a normal state; and/or if the average value is greater than or equal to the fourth threshold and the third difference is greater than a sixth threshold, then determining that the filter is in an abnormal state; if the average value is greater than or equal to the fourth threshold and the third difference is less than or equal to the sixth threshold, then determining that the filter is in a normal state.

Figure 5:
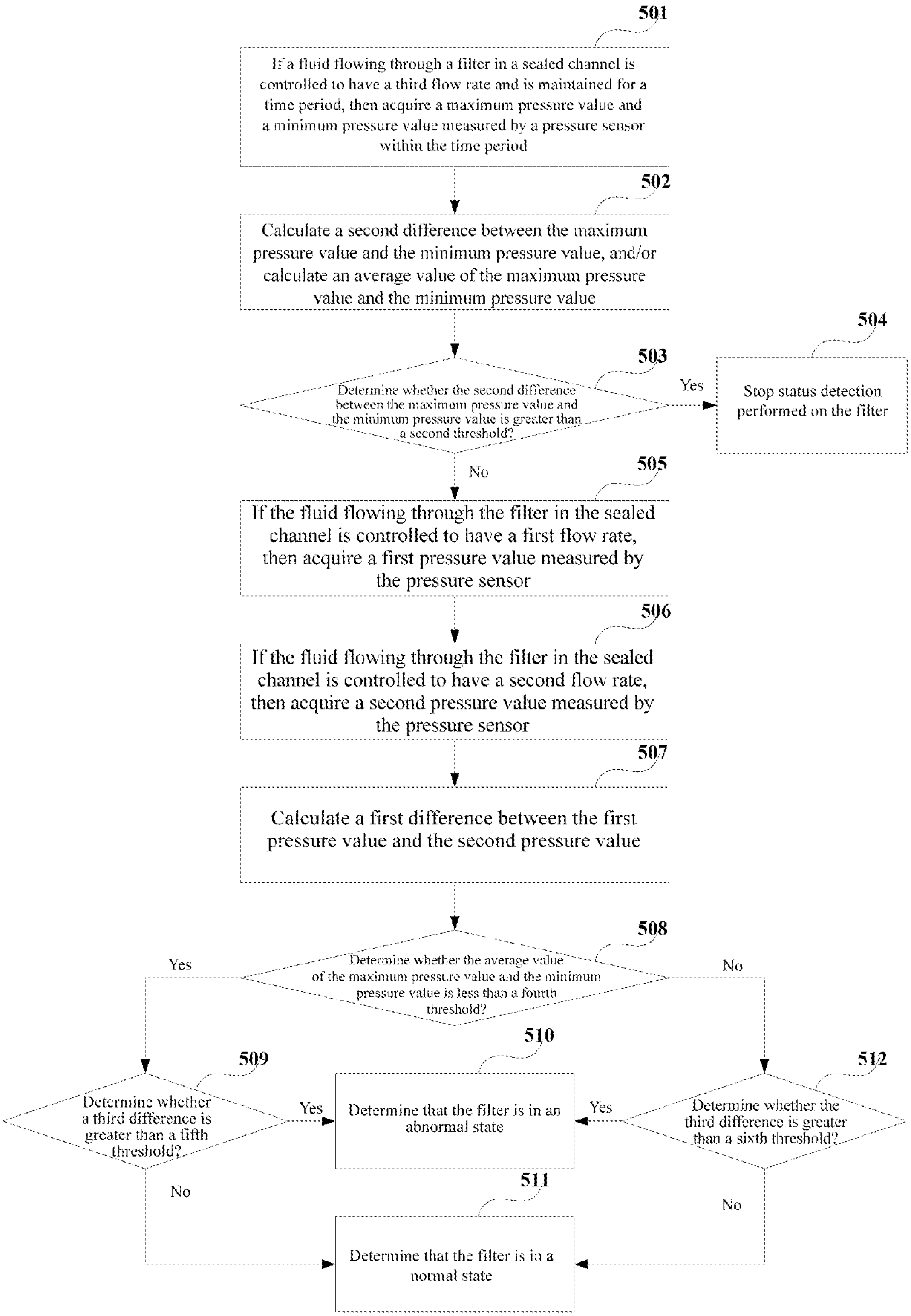
FIG. 5 is another schematic diagram of a status detection method for a filter according to embodiments of the present application.

FIG. 5 is another schematic diagram of a status detection method for a filter according to the embodiments of the present application. A coalescing filter is used as an example for detailed description. As shown in FIG. 5, the method includes:

501, if a fluid flowing through a filter in a sealed channel is controlled to have a third flow rate and is maintained for a time period, then acquire a maximum pressure value and a minimum pressure value measured by a pressure sensor within the time period; and

502, calculate a second difference between the maximum pressure value and the minimum pressure value, and/or calculate an average value of the maximum pressure value and the minimum pressure value.

For example, the third flow rate is 5 L/min and may be maintained for a time period (such as 15 seconds), and a maximum pressure value Max and a minimum pressure value Min within this time period are acquired; then a second difference D2 between the maximum pressure value and the minimum pressure value is calculated, where D2=Max−Min, and/or an average value A of the maximum pressure value and the minimum pressure value is calculated, where A=(Max+Min)/2.

As shown in FIG. 5, the method further includes:

503, determine whether the second difference between the maximum pressure value and the minimum pressure value is greater than a second threshold; and if so, then execute 404; and if not, then execute 405.

For example, it is assumed that the second threshold is 20 kpa. If the maximum pressure value acquired by the pressure sensor is 449 kpa, and if the minimum pressure value acquired by the pressure sensor is 448 kpa, then the second difference D2 between the maximum pressure value and the maximum pressure value is 1 kpa, and is less than or equal to the second threshold, namely 20 kpa. Therefore, determination of the status of the coalescing filter may be continued.

504, stop status detection performed on the filter.

For another example, if the maximum pressure value acquired by the pressure sensor is 449 kpa, and if the minimum pressure value acquired by the pressure sensor is 428 kpa, then the second difference D2 between the maximum pressure value and the maximum pressure value is 21 kpa, and is greater than the second threshold, namely 20 kpa. Therefore, in this case, an additional abnormal condition may occur, such as channel leakage, gas source unsteadiness, and the like. In this case, status monitoring performed on the coalescing filter needs to be stopped, and alarm information may be sent so that the operator can perform troubleshooting.

As shown in FIG. 5, the method further includes:

505, if the fluid flowing through the filter in the sealed channel is controlled to have a first flow rate, then acquire a first pressure value measured by the pressure sensor;

506, if the fluid flowing through the filter in the sealed channel is controlled to have a second flow rate, then acquire a second pressure value measured by the pressure sensor; and

507, calculate a first difference between the first pressure value and the second pressure value.

For example, if the first flow rate is 1 L/min, then the first pressure value acquired by the pressure sensor is 449 kpa. If the second flow rate is 15 L/min, then the second pressure value acquired by the pressure sensor is 448 kpa. The first difference D1 between the first pressure value and the second pressure value is 1 kpa.

For another example, if the first flow rate is 1 L/min, then the first pressure value acquired by the pressure sensor is 445 kpa. If the second flow rate is 15 L/min, then the second pressure value acquired by the pressure sensor is 430 kpa. The first difference D1 between the first pressure value and the second pressure value is 15 kpa.

As shown in FIG. 5, the method further includes:

508, determine whether the average value of the maximum pressure value and the minimum pressure value is less than a fourth threshold;

if the average value is less than the fourth threshold, then execute 509; and if the average value is greater than or equal to the fourth threshold, then execute 510.

For example, it is assumed that the fourth threshold is 450 kpa. In addition, if the average value A of the maximum pressure value and the minimum pressure value calculated in 502 is 449 kpa and is less than the fourth threshold, namely 450 kpa, then 509 is executed. For another example, if the average value A of the maximum pressure value and the minimum pressure value calculated in 502 is 460 kpa and is greater than the fourth threshold, namely 450 kpa, then 510 is executed.

As shown in FIG. 5, the method further includes:

509, determine whether a third difference is greater than a fifth threshold;

if the third difference is greater than the fifth threshold, then execute 510; and if the third difference is less than or equal to the fifth threshold, then execute 511;

510, determine that the filter is in an abnormal state.

511, determine that the filter is in a normal state.

For example, it is assumed that the fifth threshold is 20 kpa. If the first flow rate is 1 L/min, then the first pressure value acquired by the pressure sensor is 449 kpa. If the second flow rate is 15 L/min, then the second pressure value acquired by the pressure sensor is 448 kpa. The first difference D1 between the first pressure value and the second pressure value is 1 kpa. In addition, if the second difference D2 between the maximum pressure value and the minimum pressure value calculated in 402 is 1 kpa, then the third difference D3 between the first difference and the second difference is 0, and is less than or equal to the fifth threshold, namely 20 kpa. Therefore, it can be determined that the coalescing filter is in a normal state.

For another example, if the first flow rate is 1 L/min, then the first pressure value acquired by the pressure sensor is 445 kpa. If the second flow rate is 15 L/min, then the second pressure value acquired by the pressure sensor is 420 kpa. The first difference D1 between the first pressure value and the second pressure value is 25 kpa. In addition, if the second difference D2 between the maximum pressure value and the minimum pressure value calculated in 302 is 1 kpa, then the third difference D3 between the first difference and the second difference is 24 kpa, and is greater than the fifth threshold, namely 20 kpa. Therefore, it can be determined that the coalescing filter is in an abnormal state.

As shown in FIG. 5, the method further includes:

512, determine whether the third difference is greater than a sixth threshold;

if the third difference is greater than the sixth threshold, then execute 510; and if the third difference is less than or equal to the sixth threshold, then execute 511.

For example, it is assumed that the sixth threshold is 10 kpa. If the first flow rate is 1 L/min, then the first pressure value acquired by the pressure sensor is 449 kpa. If the second flow rate is 15 L/min, then the second pressure value acquired by the pressure sensor is 448 kpa. The first difference D1 between the first pressure value and the second pressure value is 1 kpa. In addition, if the second difference D2 between the maximum pressure value and the minimum pressure value calculated in 402 is 1 kpa, then the third difference D3 between the first difference and the second difference is 0, and is less than or equal to the sixth threshold, namely 10 kpa. Therefore, it can be determined that the coalescing filter is in a normal state.

For another example, if the first flow rate is 1 L/min, then the first pressure value acquired by the pressure sensor is 445 kpa. If the second flow rate is 15 L/min, then the second pressure value acquired by the pressure sensor is 430 kpa. The first difference D1 between the first pressure value and the second pressure value is 15 kpa. In addition, if the second difference D2 between the maximum pressure value and the minimum pressure value calculated in 402 is 1 kpa, then the third difference D3 between the first difference and the second difference is 14 kpa, and is greater than the sixth threshold, namely 10 kpa. Therefore, it can be determined that the coalescing filter is in an abnormal state.

Therefore, by using the second difference as a parameter, determination is performed in advance, so that effects of other additional factors can be excluded before status detection. In addition, determination is further performed by using the average value A as a parameter; depending on a determination result, the fifth threshold or the sixth threshold different from the fifth threshold is used, and both the first difference and the second difference are used as detection parameters, thereby further improving accuracy of status detection.

It should be noted that FIG. 5 merely schematically illustrates the embodiments of the present application; however, the present application is not limited thereto. For example, an execution sequence of various operations may be adjusted appropriately; in addition, some other operations may be added, or some operations therein may be removed. Those skilled in the art may make appropriate variations according to the above disclosure, and this is not limited merely to the disclosure of FIG. 5.

The embodiments of the present application are merely exemplarily described by using the aforementioned embodiments. However, the present application is not limited thereto, and appropriate variations may be made on the basis of the aforementioned embodiments. For example, each of the aforementioned embodiments may be used individually, and one or more of the aforementioned embodiments may also be combined.

In the embodiments of the present application, the aforementioned status detection method may be performed during a power-on self-test of a medical device (such as an anesthesia machine/ventilator). In addition, the aforementioned status detection method may be performed periodically; alternatively, performing of the aforementioned status detection method may be triggered by an event, and so on.

The embodiments of the present application further provide a status detection apparatus for a filter. The filter filters a fluid in a sealed channel. At least a pressure sensor is further provided downstream of the filter in the sealed channel. The status detection apparatus may be a hardware apparatus of an electronic device, and may also be a software module stored in an electronic device. Operation procedures of the status detection apparatus have been described in the aforementioned embodiments, and the same content will not be described herein again.

Figure 6:
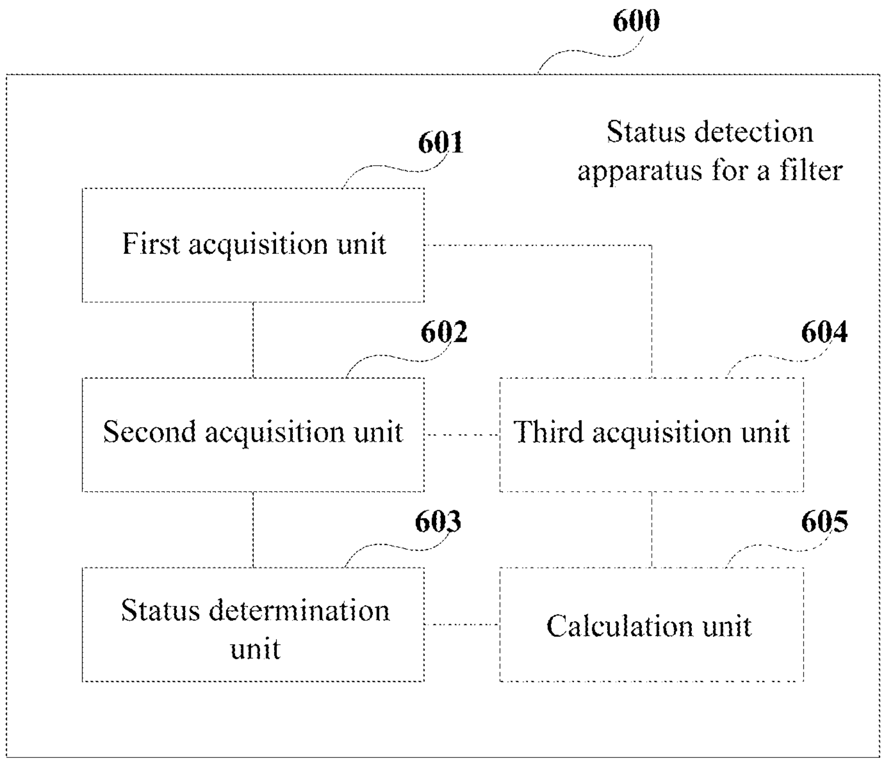
FIG. 6 is a schematic diagram of a status detection apparatus for a filter according to embodiments of the present application.

FIG. 6 is a schematic diagram of a status detection apparatus for a filter according to the embodiments of the present application. A coalescing filter is used as an example for detailed description. As shown in FIG. 6, the status detection apparatus 600 for a filter includes:

a first acquisition unit 601, wherein if a fluid flowing through a filter in a sealed channel is controlled to have a first flow rate, then the first acquisition unit 601 acquires a first pressure value measured by a pressure sensor;

a second acquisition unit 602, wherein if the fluid flowing through the filter in the sealed channel is controlled to have a second flow rate, then the second acquisition unit 602 acquires a second pressure value measured by the pressure sensor; and a status determination unit 603, wherein the status determination unit 603 determines a status of the filter according to a difference between the first pressure value and the second pressure value.

In some embodiments, if a first difference between the first pressure value and the second pressure value is greater than a first threshold, then the status determination unit 603 determines that the filter is in an abnormal state; if the first difference between the first pressure value and the second pressure value is less than or equal to the first threshold, then the status determination unit 603 determines that the filter is in a normal state.

In some embodiments, as shown in FIG. 6, the status detection apparatus 600 may further include:

- a third acquisition unit 604, wherein if the fluid flowing through the filter in the sealed channel is controlled to have a third flow rate and is maintained for a time period, then the third acquisition unit 604 acquires a maximum pressure value and a minimum pressure value measured by the pressure sensor within the time period; and
- a calculation unit 605, wherein the calculation unit 605 calculates a second difference between the maximum pressure value and the minimum pressure value and/or an average value of the maximum pressure value and the minimum pressure value.

In some embodiments, the status determination unit 603 is further configured to: determine whether the second difference between the maximum pressure value and the minimum pressure value is greater than a second threshold; stop status detection performed on the filter if the second difference is greater than the second threshold; determine the status of the filter according to the difference between the first pressure value and the second pressure value if the second difference is less than or equal to the second threshold.

In some embodiments, the calculation unit 605 is further configured to calculate a third difference between the first difference between the first pressure value and the second pressure value and the second difference.

In some embodiments, the status determination unit 603 determines that the filter is in an abnormal state if the third difference is greater than a third threshold; the status determination unit 603 determines that the filter is in a normal state if the third difference is less than or equal to the third threshold.

In some embodiments, the status determination unit 603 is further configured to determine whether the average value of the maximum pressure value and the minimum pressure value is less than a fourth threshold.

In some embodiments, if the average value is less than the fourth threshold and the third difference is greater than a fifth threshold, then the status determination unit 603 determines that the filter is in an abnormal state; if the average value is less than the fourth threshold and the third difference is less than or equal to the fifth threshold, then the status determination unit 603 determines that the filter is in a normal state.

In some embodiments, if the average value is greater than or equal to the fourth threshold and the third difference is greater than a sixth threshold, then the status determination unit 603 determines that the filter is in an abnormal state; if the average value is greater than or equal to the fourth threshold and the third difference is less than or equal to the sixth threshold, then the status determination unit 603 determines that the filter is in a normal state.

For the sake of simplicity, FIG. 6 exemplarily illustrates merely connection relationships or signal directions between various components or modules. However, those skilled in the art should understand that various related technologies such as bus connection can be used. The aforementioned components or modules may be implemented by means of hardware facilities such as a processor and a memory, and this is not limited by the embodiments of the present application.

The embodiments of the present application are merely exemplarily described by using the aforementioned embodiments. However, the present application is not limited thereto, and appropriate variations may be made on the basis of the aforementioned embodiments. For example, each of the aforementioned embodiments may be used individually, and one or more of the aforementioned embodiments may also be combined.

The embodiments of the present application further provide a medical device, provided with a filter. The filter filters a fluid in a sealed channel. At least a pressure sensor is further provided downstream of the filter in the sealed channel. The medical device further includes the aforementioned status detection apparatus for a filter. The filter of the aforementioned medical device may be a coalescing filter.

Figure 7:
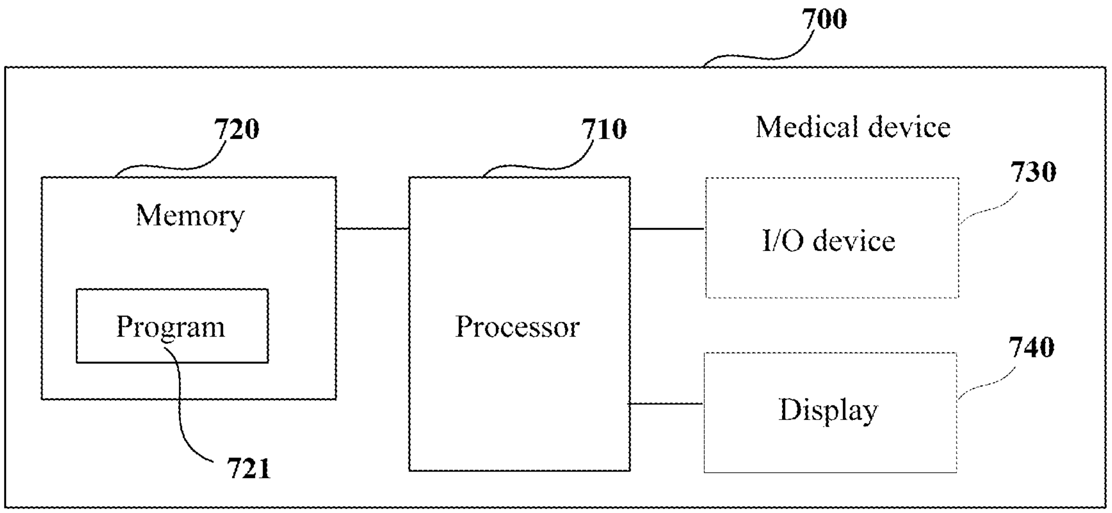
FIG. 7 is a schematic diagram of a medical device according to embodiments of the present application.

FIG. 7 is a schematic diagram of a medical device according to the embodiments of the present application. As shown in FIG. 7, the medical device 700 may include: one or more processors (for example, central processing units (CPUs)) 710 and one or more memories 720. The memory 720 is coupled to the processor 710. The memory 720 may store various data. In addition, an information processing program 721 is also stored, and under control of the processor 710, the program 721 is executed.

In some embodiments, the function of the status detection apparatus 600 for a filter is integrated into and implemented by the processor 710. The processor 710 is configured to implement the status detection method for a filter described in the foregoing embodiments.

In some embodiments, the status detection apparatus 600 for a filter is configured to be separate from the processor 710. For example, the status detection apparatus 600 for a filter may be configured to be a chip connected to the processor 710, and the function of the status detection apparatus 600 for a filter is implemented under control of the processor 710.

For example, the processor 710 is configured to perform the following control: if a fluid flowing through a filter in a sealed channel is controlled to have a first flow rate, then acquiring a first pressure value measured by a pressure sensor; if the fluid flowing through the filter in the sealed channel is controlled to have a second flow rate, then acquiring a second pressure value measured by the pressure sensor; and determining a status of the filter according to a difference between the first pressure value and the second pressure value.

For another example, the processor 710 is configured to perform the following control: if a first difference between the first pressure value and the second pressure value is greater than a first threshold, then determining that the filter is in an abnormal state; and if the first difference between the first pressure value and the second pressure value is less than or equal to the first threshold, then determining that the filter is in a normal state.

For another example, the processor 710 is configured to perform the following control: if the fluid flowing through the filter in the sealed channel is controlled to have a third flow rate and is maintained for a time period, then acquiring a maximum pressure value and a minimum pressure value measured by the pressure sensor within the time period; and calculating a second difference between the maximum pressure value and the minimum pressure value and/or an average value of the maximum pressure value and the minimum pressure value.

For another example, the processor 710 is configured to perform the following control: determining whether the second difference between the maximum pressure value and the minimum pressure value is greater than a second threshold; if the second difference is greater than the second threshold, then stopping status detection performed on the filter; and if the second difference is less than or equal to the second threshold, then determining the status of the filter according to the difference between the first pressure value and the second pressure value.

For another example, the processor 710 is configured to perform the following control: calculating a third difference between the first difference between the first pressure value and the second pressure value and the second difference.

For another example, the processor 710 is configured to perform the following control: if the third difference is greater than a third threshold, then determining that the filter is in an abnormal state; and if the third difference is less than or equal to the third threshold, then determining that the filter is in a normal state.

For another example, the processor 710 is configured to perform the following control: determining whether the average value of the maximum pressure value and the minimum pressure value is less than a fourth threshold.

For another example, the processor 710 is configured to perform the following control: if the average value is less than the fourth threshold and the third difference is greater than a fifth threshold, then determining that the filter is in an abnormal state; and if the average value is less than the fourth threshold and the third difference is less than or equal to the fifth threshold, then determining that the filter is in a normal state.

For another example, the processor 710 is configured to perform the following control: if the average value is greater than or equal to the fourth threshold and the third difference is greater than a sixth threshold, then determining that the filter is in an abnormal state; and if the average value is greater than or equal to the fourth threshold and the third difference is less than or equal to the sixth threshold, then determining that the filter is in a normal state.

In addition, as shown in FIG. 7, the medical device 700 may further include: an input/output (I/O) device 730, a display 740, and the like. The functions of the aforementioned components are similar to those of the prior art, and will not be described herein again. It should be noted that the medical device 700 does not necessarily include all of the components shown in FIG. 7. In addition, the medical device 700 may further include components not shown in FIG. 7, and reference may be made to related technologies.

The embodiments of the present application further provide a computer-readable program. When executed in a medical device, the program causes a computer to perform, in the medical device, the status detection method for a filter described in the foregoing embodiments.

The embodiments of the present application further provide a storage medium storing a computer-readable program. The computer-readable program causes a computer to perform, in a medical device, the status detection method for a filter described in the foregoing embodiments.

The aforementioned apparatuses and methods according to the present application may be implemented by hardware, and may also be implemented by a combination of hardware and software. The present application relates to such a computer-readable program that when the program is executed by a logic component, the logic component is enabled to implement the apparatuses or components described above, or the logic component is enabled to implement the methods or steps described above. The present application further relates to a storage medium for storing the above program, such as a hard disk, a magnetic disk, an optical disc, a DVD, a flash memory, and the like.

The method/apparatus described with reference to the embodiments of the present application may be directly embodied as hardware, a software module executed by a processor, or a combination of the two. For example, one or more functional block diagrams and/or one or more combinations of the functional block diagrams shown in the drawings may correspond to software modules of procedures of a computer program, and may also correspond to hardware modules. These software modules may respectively correspond to the steps shown in the drawings. These hardware modules may be implemented by, for example, using a field programmable gate array (FPGA) to convert these software modules into firmware.

The software module may be located in a RAM, a flash memory, a ROM, an EPROM, an EEPROM, a register, a hard disk, a removable disk, a CD-ROM, or any storage medium in other forms known in the art. A storage medium may be coupled to a processor, so that the processor can read information from the storage medium and write information into the storage medium. Alternatively, the storage medium may be a component of the processor. The processor and the storage medium may be located in an ASIC. The software module may be stored in a memory of a mobile terminal, and may also be stored in a memory card capable of being inserted into a mobile terminal. For example, if a device (such as a mobile terminal) uses a MEGA-SIM card having a relatively large capacity or a flash memory apparatus having a large capacity, then the software module may be stored in the MEGA-SIM card or the flash memory apparatus having a large capacity.

One or more functional blocks and/or one or more combinations of the functional blocks in the accompanying drawings may be implemented as a universal processor, a digital signal processor (DSP), an application-specific integrated circuit (ASIC), a field programmable gate array (FPGA), or other programmable logic devices, discrete gate or transistor logic devices, discrete hardware assemblies, or any appropriate combination thereof implementing the functions described in the present application. The one or more functional blocks and/or one or more combinations of the functional blocks in the accompanying drawings may also be implemented as a combination of computing devices, such as a combination of a DSP and a microprocessor, multiple processors, one or more microprocessors in communication combination with a DSP, or any other such configuration.

The present application is described above with reference to the specific implementation manners. However, it should be understood by those skilled in the art is aware that such description is merely exemplary and is not intended to limit the protection scope of the present application. Various variations and modifications may be made by those skilled in the art to the present application according to the principle of the present application, and these variations and modifications also fall within the scope of the present application.

The invention claimed is:

1. A medical device comprising:

a channel configured to provide fluid flow;

a filter provided in the channel;

a pressure sensor provided in the channel at a location downstream from the filter;

a memory storing instructions; and a processor configured to execute the instructions to:

control fluid to flow through the channel at a first flow rate and acquire, from the pressure sensor, a first pressure value at the first flow rate;

control fluid to flow through the channel at a second flow rate and acquire, from the pressure sensor, a second pressure value at the second flow rate;

control fluid to flow through the channel at a third flow rate for a period of time;

acquire, by the pressure sensor, a maximum pressure value and a minimum pressure value within the period of time;

determine a state of the filter according to a first difference value between the first pressure value and the second pressure value;

determine a state of the filter based on the first difference value;

determine a second difference value between the maximum pressure value and the minimum pressure value; and based on a determination that the filter is in an abnormal state, output a service indicator.

2. The medical device according to claim 1, wherein the filter is a coalescing filter.

3. The medical device according to claim 1, wherein the processor is further configured to execute the instructions to:

based on the first difference value being greater than a first threshold, determine that the filter is in the abnormal state; and based on the first difference value being less than or equal to the first threshold, determine that the filter is in a normal state.

4. The medical device according to claim 1, wherein the processor is further configured to execute the instructions to:

based on the second difference value being greater than a second threshold, stop state detection performed on the filter; and based on the second difference value being greater than a second threshold, determine the state of the filter according to the difference between the first pressure value and the second pressure value.

5. The medical device according to claim 4, wherein the processor is further configured to execute the instructions to:

obtain a third difference value between the first difference value and the second difference value.

6. The medical device according to claim 5, wherein the processor is further configured to execute the instructions to:

based on the third difference being greater than a third threshold, determine that the filter is in the abnormal state; and based on the third difference being less than or equal to the third threshold, determine that the filter is in a normal state.

7. The medical device according to claim 5, wherein the processor is further configured to execute the instructions to:

determine whether an average of the maximum pressure value and the minimum pressure value is less than a fourth threshold.

8. The medical device according to claim 7, wherein the processor is further configured to execute the instructions to:

based on the average of the maximum pressure value and the minimum pressure value being less than the fourth threshold and the third difference being greater than a fifth threshold, determine that the filter is in the abnormal state; and based on the average value being less than the fourth threshold and the third difference being less than or equal to the fifth threshold, determine that the filter is in a normal state.

9. The medical device according to claim 7, wherein the processor is further configured to execute the instructions to:

based on the average of the maximum pressure value and the minimum pressure value being greater than or equal to the fourth threshold and the third difference being greater than a sixth threshold, determine that the filter is in the abnormal state; and based on the average value being greater than or equal to the fourth threshold and the third difference being less than or equal to the sixth threshold, determine that the filter is in a normal state.

* * * * *